(12) United States Patent
Yuan

(10) Patent No.: US 9,868,842 B2
(45) Date of Patent: Jan. 16, 2018

(54) AUTOMATIC DEVULCANIZING AND PLASTICIZING DEVICE AND METHOD FOR USING SAME

(71) Applicant: 6732667 Manitoba Inc., Winnipeg (CA)

(72) Inventor: Qiang(Charles) Yuan, Winnipeg (CA)

( * ) Notice: Subject to any disclaimer, the term of this patent is extended or adjusted under 35 U.S.C. 154(b) by 0 days.

(21) Appl. No.: 15/031,316

(22) PCT Filed: Oct. 23, 2014

(86) PCT No.: PCT/CA2014/051021
§ 371 (c)(1),
(2) Date: Apr. 22, 2016

(87) PCT Pub. No.: WO2015/061895
PCT Pub. Date: May 7, 2015

(65) Prior Publication Data
US 2016/0272778 A1    Sep. 22, 2016

Related U.S. Application Data

(60) Provisional application No. 61/896,892, filed on Oct. 29, 2013.

(51) Int. Cl.

| | | |
|---|---|---|
| *C08J 11/18* | (2006.01) | |
| *B29B 17/04* | (2006.01) | |
| *C08C 19/00* | (2006.01) | |
| *C08J 3/18* | (2006.01) | |
| *C08J 11/04* | (2006.01) | |
| *B29B 17/00* | (2006.01) | |
| *C08J 11/10* | (2006.01) | |
| *B29B 7/14* | (2006.01) | |
| *B29B 7/24* | (2006.01) | |
| *C08L 17/00* | (2006.01) | |
| *B29K 21/00* | (2006.01) | |
| *B29K 105/26* | (2006.01) | |

(52) U.S. Cl.
CPC ............. *C08J 11/18* (2013.01); *B29B 7/14* (2013.01); *B29B 7/244* (2013.01); *B29B 17/0026* (2013.01); *B29B 17/04* (2013.01); *B29B 17/0412* (2013.01); *C08C 19/00* (2013.01); *C08J 3/18* (2013.01); *C08J 11/04* (2013.01); *C08J 11/10* (2013.01); *C08L 17/00* (2013.01); *B29K 2021/00* (2013.01); *B29K 2105/26* (2013.01); *C08J 2321/00* (2013.01); *Y02W 30/62* (2015.05)

(58) Field of Classification Search
CPC ................................. B29B 17/02; C08J 11/06
USPC ........................................................ 521/48
See application file for complete search history.

(56) References Cited

U.S. PATENT DOCUMENTS

| | | | | |
|---|---|---|---|---|
| 2,642,623 | A * | 6/1953 | Bohannon | B29C 45/53 425/200 |
| 5,510,419 | A * | 4/1996 | Burgoyne | B29B 7/002 525/331.9 |
| 6,133,413 | A * | 10/2000 | Mouri | C08J 11/12 523/307 |
| 6,335,377 | B1 * | 1/2002 | Izumoto | B29B 17/00 521/41 |
| 6,583,211 | B1 * | 6/2003 | Wayts | C08J 3/005 521/40 |

FOREIGN PATENT DOCUMENTS

| | | |
|---|---|---|
| CN | 101817933 | 9/2010 |
| CN | 102977404 | 3/2013 |
| CN | 103341921 | 10/2013 |
| EP | 2371886 | 10/2011 |

* cited by examiner

*Primary Examiner* — Terressa Boykin
(74) *Attorney, Agent, or Firm* — Michael R Williams; Kyle R Satterthwaite; Ade & Company Inc

(57) ABSTRACT

Rubber to be recycled is first ground to rubber crumb and then is transferred to a plasticizing unit. The rubber to be recycled is mixed with chemicals including an aromatic, environmental-friendly, low volatility reaction oil, a thickening agent and an activator. This mixture is heated to a desired temperature under anaerobic conditions and then is maintained at that temperature for a suitable time. The processed material is then transferred to a cooling unit in which it is cooled to a temperature below 60° C. prior to being released from the machine.

24 Claims, 1 Drawing Sheet

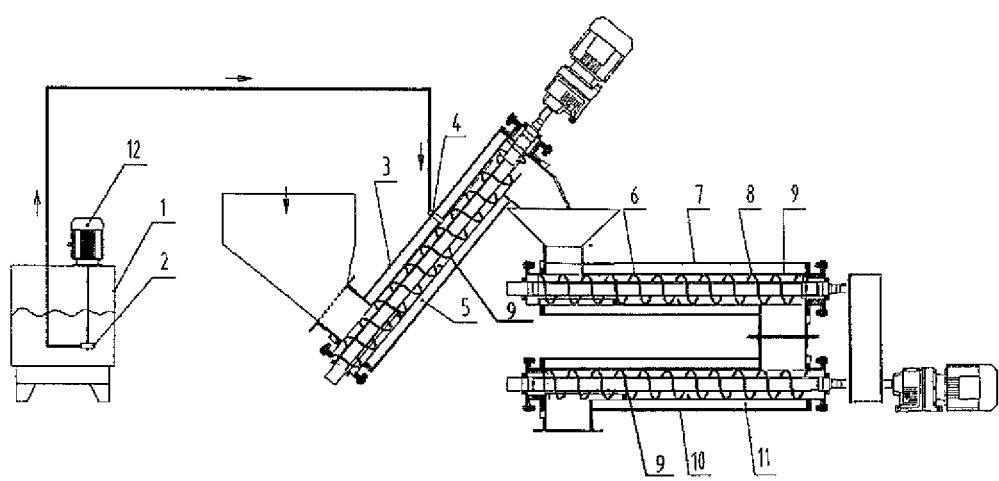

AUTOMATIC DEVULCANIZING AND PLASTICIZING DEVICE AND METHOD FOR USING SAME

PRIOR APPLICATION INFORMATION

The instant application claims the benefit of U.S. Provisional Patent Application 61/896,892, filed Oct. 29, 2013.

BACKGROUND OF THE INVENTION

In order to meet high performance requirements, rubber-based products are often designed to have high strength, stability and wear resistance. However, these highly durable products are consequently very difficult to degrade and/or recycle or reclaim.

Rubber powder or rubber crumb is the intermediate product that is used in rubber recycling. As will be appreciated by one of skill in the art, the quality of the rubber powder is critical for the production of quality reclaimed rubber products. Many processes produce plasticized recycled rubber that has highly variable chemical and physical properties and are therefore unsuitable for the production of many products.

Currently, dynamic vulcanization is the primary process for rubber powder desulphurization. However, this process requires high pressure, has high energy consumption, requires water injection and produces exhaust emissions.

SUMMARY OF THE INVENTION

According to a first aspect of the invention, there is provided a method of recycling rubber comprising:

(a) grinding a quantity of rubber to be recycled to a particle size between 10 mesh to 40 mesh, that is, about 0.4 mm to about 2.0 mm, thereby producing rubber crumb;

(b) providing a rubber plasticizing machine comprising a plasticizing unit comprising a plasticizing conveyor and a cooling unit comprising a cooling conveyor;

(c) transferring the rubber crumb into the plasticizing unit;

(d) mixing the rubber crumb with chemicals, thereby producing a mixture, said chemicals comprising a reaction oil, a viscosity increaser and an activator;

(e) heating the mixture in the plasticizing unit to a temperature between 200-250° C. and maintaining the mixture at said temperature for a pre-determined period of time;

(f) transferring the mixture from the heating unit to the cooling unit;

(g) cooling the mixture in the cooling unit to a temperature below 60° C.; and (h) releasing the mixture from the cooling unit.

In some embodiments, the rubber to be recycled is ground such that at least 50% of the rubber crumb has a mesh size of 40, that is, an average diameter of about 0.4 mm or 400 microns. As will be apparent to one of skill in the art, rubber crumb of a smaller mesh size will react more quickly; however, finer grinding requires additional time and resources and can result in loss of product value.

In some embodiments, following step (a), calcium carbonate powder or talc powder is added to the rubber crumb at 0.1-5% (w/w) of the rubber crumb. As discussed below, this is done in specific embodiments in which it is desired to alter the physical properties of the plasticized rubber powder produced by the method.

Preferably, the plasticizing unit and the cooling unit are air tight so that rubber crumb is plasticized under anaerobic conditions. As discussed below, maintaining anaerobic conditions throughout the plasticizing process produces a plasticized rubber powder that has improved and much more reproducible and reliable chemical and physical properties.

Preferably, the chemicals and the rubber crumb are mixed by the plasticizing conveyor. Specifically, in some embodiments, the ground rubber crumb and the chemicals are injected into a first plasticizing chamber of the plasticizing unit under anaerobic conditions. The conveyor, for example, a screw auger, moves the ground rubber crumb and the chemicals to the next plasticizing chamber. The action of the screw conveyor mixes the chemicals and the ground rubber crumb. As the mixture passes from one plasticizing chamber to the next, the temperature of the mixture is progressively increased until the desired reaction temperature is attained, as discussed below. The mixture is then retained at that temperature for a predetermined time, for example, 5-15 minutes, so that the reaction can go to completion.

The mixture is then transferred from the last plasticizing chamber to the first cooling chamber of the cooling unit. Therein, a conveyor, for example, a screw auger, moves the material from the first cooling chamber to the next cooling chamber. Each subsequent cooling chamber in series cools the plasticized rubber powder to a progressively lower temperature until the plasticized rubber powder reaches a temperature below 60° C., at which point the plasticized rubber powder is ejected from the machine or device, that is, from the last cooling chamber, as discussed herein.

As discussed above, all of the cooling chambers of the cooling unit and all of the plasticizing chambers of the plasticizing unit are substantially air tight so that the plasticizing and cooling are carried out under anaerobic conditions so that the plasticized rubber powder is not oxidized by high temperature.

BRIEF DESCRIPTION OF THE DRAWINGS

FIG. 1 is a schematic diagram of the process of the invention.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a machine and a process or method for using the machine in which rubber to be recycled is first ground to rubber crumb and then is transferred as a batch or continuously added to a plasticizing unit. As discussed herein, the plasticizing unit comprises one or more plasticizing chambers, wherein a respective one of the plasticizing chambers is connected to an adjacent plasticizing chamber for the transfer of rubber that is to be recycled therebetween. As discussed below, the rubber to be recycled is heated to a desired temperature and then is maintained at that temperature for a suitable time. The plasticizing chambers include conveying means for moving the processing material along the plasticizing chambers, as discussed herein. The processed material is then transferred to a cooling unit, as discussed below.

As discussed below, suitable chemicals are sprayed or injected into the ground rubber crumb in the plasticizing unit. By varying the chemicals injected and the quantity and relative ratios thereof, as well as the processing times and temperatures, a variety of different reclaimed plasticized rubber powders can be generated, each having different physical characteristics such as tensile strength, density and elasticity, as discussed below, which can be used for the manufacture of different end products, as discussed below. As discussed herein, the process can be a batch process in which rubber crumb to be processed is loaded prior to starting processing or in a continuous process in which rubber crumb is added continuously.

The transfer of rubber crumb into the plasticizing unit is carried out anaerobically, that is, in the absence of oxygen, for example, by spraying or otherwise injecting the rubber crumb into the plasticizing unit and then spraying the rubber crumb with heated chemicals, as discussed herein. In fact, in some embodiments, the process is kept anaerobic throughout processing, that is, until the treated material is released or ejected from the last cooling chamber, as discussed herein. As a result of this arrangement, no noxious gases are released to the environment during processing and no oxidation of the plasticized recycled rubber takes place, as discussed below.

As discussed below, the plasticized rubber generated from the process is ready to be used in the production of a wide variety of reclaimed rubber products, including but by no means limited to: mats; crumb rubber derived products; playground surfaces; athletic surfaces; molded products; infill; soil stabilization products; surfacing products for, for example, rooftops, driveways, and patios; non-motorized vehicle tires and conveyor belts.

As discussed below, the machine or device comprises a feeder unit, a plasticizing unit, a softening agent supply unit and a cooling unit.

The feeder unit supplies ground rubber crumb to the plasticizing unit, for example, by spraying or otherwise transferring the ground rubber crumb into the plasticizing unit under anaerobic conditions, that is, in the absence of oxygen or air, as discussed below. As will be appreciated by one of skill in the art, the feeder unit may be arranged in any of a variety of ways known in the art, depending on the area in which the process is carried out.

The plasticizing unit comprises one or more plasticizing chambers, for example 1, 2, 3, 4, 5, 6, 7, 8, 9, 10 or more plasticizing chambers, depending on the quantity of material to be processed. Each individual plasticizing chamber has conveying means, for example, a conveyer such as a screw auger, for moving the material along the length of the respective plasticizing chambers. As discussed herein, in those embodiments wherein there is more than one plasticizing chamber, each plasticizing chamber is connected to a subsequent adjacent plasticizing chamber in series except for the last plasticizing chamber which is connected to the first cooling chamber, as discussed below.

As discussed below, the individual plasticizing chambers are arranged to heat material being processed therein to a suitable temperature and maintain that material at that temperature for a suitable period of time. As will be appreciated by one of skill in the art, the actual dimensions of the plasticizing chambers are dependent upon the ability of the heating unit to heat all of the material in a given chamber to the desired temperature within the desired period of time.

For example, in some embodiments, the suitable temperature is between 200-250° C. In some embodiments, it may take approximately 10-30 minutes for the rubber crumb being processed or recycled to reach the desired temperature and the rubber crumb being recycled may be maintained at that temperature for 5-15 minutes.

As discussed herein, many factors will influence the characteristics and overall quality of the recycled rubber produced by the process. For example, the quality of the rubber being recycled, the particle size of the ground rubber crumb, the chemicals added, the quantities and relative ratios thereof and the temperature of plasticizing and duration thereof. That is, the reaction time and reaction temperature also greatly influence the properties of the end product.

As will be appreciated by one of skill in the art, the plasticizing chambers may be heated by any suitable means known in the art, for example but by no means limited to conduction oil heaters, electromagnetic heating, burner, steam or electric heating.

As will be appreciated by one of skill in the art and as discussed below, the length of each respective plasticizing chamber may be varied and/or the rate at which the material is transported along the respective chamber by the respective conveying means may be varied.

There is also provided a softening agent supply unit. The softening agent supply unit may comprise one or more metering pumps, each respective metering pump being connected to a supply of one or more chemicals, a jet nozzle for spraying chemicals into the material to be processed and a heating unit arranged to heat the chemicals.

The metering pump may be any suitable pump arrangement known in the art, for example but by no means limited to a gear pump, a general pump, an impeller mechanism, a piston mechanism, or a pneumatic conveying mechanism.

The chemicals to be injected include but are by no means necessarily limited to: a reaction oil, a viscosity increaser, and an activator. These softening agents make the ground rubber soft and easy to knead as discussed below.

Specifically, the activator and the viscosity increaser are used to accelerate and control the reaction speed as well as the degree to which the reaction is completed. The reaction oil is used to make rubber powder expand and softens it, which in turn facilitates the action of the other reactants.

As will be known to those knowledgeable of methods of rubber reclamation, typical reaction oils include coal tar and pine tar. However, use of these materials can result in the release of carcinogens or low-molecular weight volatile compounds during processing. Tall oil and aromatic oils have also been suggested as possible reaction oils. The inventor has found that aromatic oils, particularly aromatic oils with a high flash point and low volatility, for example, residual aromatic extract oil, an aromatic extract from vacuum-distillation residual oil, are highly effective within this process. Specifically, use of the low volatility aromatic oils shortens the reaction time while promoting a higher degree of completion of the reaction. The aromatic oil also has a lower environmental impact than traditional reaction oils such as coal tar. Furthermore, as discussed herein, the inventor has demonstrated that use of this oil can improve tensile strength by 15% and elongation at break by 10%, In preferred embodiments, the reaction oil is added at 5-30% (v/w) of the rubber crumb weight. In more preferred embodiments, the reaction oil is added at 15-20% (v/w).

Preferably, the viscosity increaser or thickening agent is a rosin, more preferably, natural gum rosin having a chemical formula of $C_{19}H_{29}COOH$. As discussed herein, the rosin increases tensile strength and elongation at break of the end product(s). Preferably, the rosin is added at 0.5-5% (v/w) of the ground rubber crumb.

The activator is preferably a mixture of an activating agent and a plasticizing agent. In preferred embodiments, the activator is added at 0.05-0.8% (v/w) of the rubber powder. In some embodiments, the activating agent and the plasticizing agent are selected from activating agents and plasticizing agents known in the art. For example, in some embodiments, the activating agent is sold under the trade name of 420 or 450. These are commercially available rubber activators having the chemical formula $C_{22}H_{30}O_2S_2$. It is of note that these chemicals are added to accelerate the speed of thermal oxidation. In these embodiments, the plasticizing agent is preferably selected from plasticizing agents sold commercially under the trade name 480 and 510.

In more preferred embodiments, the activator is a mixture of pentachlorothiophenol and stearic acid.

In yet more preferred embodiments, the activator is a mixture of 30-45% pentachlorothiophenol and 55-70% stearic acid.

As discussed above, while activating agents and plasticizing agents known in the art may be used within the invention, the inventor has discovered that the combination of pentachlorothiophenol and stearic acid provides many benefits over the prior art combinations. Specifically, the inventor has found that by varying the ratio of pentachlorothiophenol to stearic acid and by varying the ratio of this mixture added per weight of the ground rubber crumb, the physical properties of the end product can be varied so as to better suit customer's needs, that is, so that the physical properties of the end product better match the intended use, as demonstrated in the examples provided below.

In some embodiments, calcium carbonate or talc is added at 0-5% (w/w) of the ground rubber crumb for altering the relative density of the end product. The talc is generally mixed with the ground rubber crumb prior to transferring this material to be processed to the plasticizing unit.

As will be appreciated by one of skill in the art, the chemicals may be heated prior to injection by any suitable means known in the art, for example but by no means limited to conduction oil heaters, electromagnetic heating, burner, steam or electric heating. For example, some or all of the chemicals may be heated to a temperature above 55° C., for example, 55-65° C. Specifically, in some embodiments, the reaction oil may be highly viscous at room temperature and may need to be heated to a suitable temperature prior to injection or addition to the material to be processed within the plasticizing unit.

The conveying means acts to stir the material to be processed as the chemicals are sprayed into the material to be processed by the jet nozzle. This obviates the need to provide a separate mixing device and allows for the process to be carried out in the absence of oxygen, as discussed herein. Specifically, heating the ground rubber and chemicals in open air while mixing results in the release of volatile compounds. In contrast, injecting the chemicals in the plasticizing unit while mixing the material and the chemicals via the conveying means causes the softening agents to be mixed more thoroughly throughout the material to be processed which in turn improves the stability and reliability of the rubber crumb end product, as discussed below. Furthermore, the plasticizing unit and cooling unit are substantially air tight so that the entire process is anaerobic, thereby preventing oxidation of the material being processed, as discussed herein.

The cooling unit comprises one or more cooling chambers, for example 1, 2, 3, 4, 5, 6, 7, 8, 9, 10 or more cooling chambers. Each individual cooling chamber has conveying means, for example, a screw conveyer, for moving the material along the length of the respective cooling chambers. As discussed herein, in those embodiments wherein there is more than one cooling chamber, each cooling chamber is connected at one end thereof to an adjacent cooling chamber except for the first cooling chamber in series which is connected to the last plasticizing chamber, as discussed below.

Each respective cooling chamber may be cooled by any suitable means known in the art, for example, by a coolant, by air, or by cool air cooling.

As discussed above, the temperatures of each of the respective plasticizing chambers and cooling chambers may be varied. As a result of this arrangement, as discussed herein, the process can be carried out in a step-wise manner, at a variety of temperatures and residence times which in turn results in the production of a variety of rubber powders with different physical characteristics, as discussed below and in the examples.

Specifically, cooling in this manner, under anaerobic conditions, such that the processed material does not exit the automatic rubber-plasticizing system until it has cooled to a temperature below 60° C., for example, to a temperature below 50° C., preferably to a temperature below 40° C., has several benefits. Specifically, cooling of the material anaerobically reduces the emission of volatile gases. Furthermore, processed material released at a temperature greater than 60° C. can still be oxidized by the air. As discussed herein, oxidation of the processing material can reduce physical and chemical characteristics, resulting in end product inconsistencies which are avoided in the inventor's anaerobic process.

Referring to FIG. 1, the automatic rubber plasticizing system according to the invention comprises a softening agent supplying device (1), feeding device (3), plasticizing unit, and cooling unit. The plasticizing unit comprises one or more plasticizing chambers (7), and the cooling device comprises one or more cooling chambers (10). The output of the feeding device (3) is connected to the input of the first plasticizing chamber (7). Each plasticizing chamber (7) has its output connected to the input of the following one, as discussed above. The output of the last plasticizing unit (7) is connected to the input of the first cooling unit (10). The feeding device (3), plasticizing unit (7) and cooling unit (10) have conveying means, that is, advancing channels (9) inside where screw conveyors (6) are provided. The heating component I (5) is provided with a jet nozzle (4) in communication with an advancing channel (9). The softening agent supplying device (1) is internally provided with softening agent and externally provided with a motor (12). A metering pump (2) is arranged in the softening agent. One end of the metering pump (2) is connected to the external motor (12), and the other end of the metering pump (2) is connected to the jet nozzle (4). The plasticizing unit (7) has external heating component II (8), and the cooling unit (10) has external cooling component (11).

During the process, rubber crumb enters the advancing channel (9) of the feeding device (3) from its input. It is fed into the first plasticizing chamber. The motor (12) provides the metering pump (2) with power. The metering pump (2) sends the softening agent from the softening agent supplying unit (1) to the jet nozzle (4). The softening agent that exits the jet nozzle (4) is mixed together with the material to be processed in the plasticizing chamber. The screw conveyor (6) provides stirring during the process.

In use, the rubber to be recycled is ground to a size of 10 mesh to 40 mesh, that is, so that at least 50% of the rubber crumb has an average diameter of about 0.4 mm to about 2.0 mm, that is, so that the rubber crumb can pass through a 40 MESH screen. In other embodiments, the rubber to be recycled is ground to an average diameter of about 0.4 mm to about 2.0 mm, thereby producing rubber crumb.

As will be appreciated by one of skill in the art, the larger the rubber particle is, the longer it takes for the rubber particle to be plasticized. However, grinding the rubber to be recycled to even finer mesh sizes takes additional time and resources and can also result in loss of product. Consequently, although smaller particles (smaller than −40 mesh) would be plasticized more quickly, and may be used in some embodiments, the inventor has found that in most embodiments, 10 mesh to 40 mesh and more particularly 40 mesh, that is, wherein greater than 50% of the rubber crumb particles—pass through a 40 mesh screen, is most cost effective.

In some embodiments, as discussed above, calcium carbonate or talc is added to the ground rubber crumb at 0-5% (w/w) of the rubber crumb in those embodiments in which it is desired to alter the relative density and plasticity of the end product.

As discussed herein, the ground rubber may be processed in a batch, wherein all of the material to be processed is transferred to the plasticizing unit prior to heating or in a continuous process wherein material to be processed is continually added. The plasticizing unit is sealed during processing, meaning that no noxious gases are evolved during processing. Thus, the processing of the rubber takes place anaerobically, in the absence of oxygen. As discussed above, as a result of this arrangement, the plasticized rubber is not oxidized by air within the device and therefore has improved and more consistent physical and chemical properties, as discussed herein.

Specifically, the material to be processed is transferred to the first plasticizing chamber wherein the chemicals are also added. The conveying means serves to mix the processing material and the chemicals. In preferred embodiments, the injected chemicals are heated prior to injection, particularly in embodiments in which a viscous (at room temperature) reaction oil is utilized. Furthermore, as discussed above, this mixing takes place in the absence of oxygen so that no oxidation of the processing material takes place.

It is of note that the material to be processed is at room temperature when it is transferred into the first plasticizing chamber because, as discussed above, pre-heating the rubber crumb in the presence of air or oxygen for example to a temperature above 60° C. can result in some oxidation of the rubber crumb.

In some embodiments, the temperature of the preceding plasticizing unit is lower than or equal to the temperature of the subsequent plasticizing unit. That is, the temperature of the second plasticizing unit is greater than the first plasticizing unit. As a result of this arrangement, the processing material is heated in a step-wise manner until the desired reaction temperature is attained. For example, the temperature of each subsequent plasticizing unit in series may be higher than the temperature of the preceding plasticizing unit until the last one or last two plasticizing units which may be at the same temperature as the preceding plasticizing unit. As will be appreciated by one of skill in the art, the heating time and the reaction time are thus controlled by the rate at which the conveying means moves the processing material through each plasticizing chamber.

Preferably, the chemicals are injected using a jet nozzle connected to a metering device, as discussed above.

Specifically, in some embodiments, the reaction oil, preferably, an aromatic oil having a high flash point, for example, residual aromatic extract oil is added at 5-30% (v/w) of the ground rubber powder weight; a viscosity increaser, for example, natural gum rosin is added at 0.5-5% (v/w) of the ground rubber powder weight; and the activator is added at 0.05-0.8% (v/w) of the ground rubber powder weight. In preferred embodiments, the activator is a mixture of 30-45% pentachlorothiophenol and 55-70% stearic acid.

Preferably, at least the reaction oil is heated to a temperature between 55° C. to 65° C. prior to injection.

In more preferred embodiments, the reaction oil is added at 15-20% (v/w) of the ground rubber powder weight.

As discussed above, the material to be processed is heated to a suitable reaction temperature and then is maintained at that reaction temperature for a predetermined period of time so that the plasticizing reaction is carried out to the desired degree of completion.

As will be appreciated by one of skill in the art, the exact reaction temperature, the duration of the reaction, the chemicals added and the quantities and relative ratios thereof depends on the quality of the rubber powder and the desired physical and chemical properties of the end product.

For example, the material to be plasticized or processed, that is the ground rubber crumb (and in some embodiments, talc), once inside the plasticizing unit, may be heated to a temperature between 200–250° C. from room temperature within 10-30 minutes and the material to be plasticized is maintained at that temperature for 5-15 minutes. As discussed above, the heating and plasticizing takes place anaerobically, in the absence of oxygen, so that the plasticized rubber is not oxidized.

The material is then transferred from the last of the plasticizing chambers to the first cooling chamber of the cooling unit. The cooling unit also includes conveyance means and the reacted material is cooled while being passed along the cooling unit via the conveyance means.

In some embodiments, the material is cooled step wise and in a controlled manner. As will be appreciated by one of skill in the art, cooling too quickly will reduce the quality of the end product by altering the physical and chemical properties of the end product.

That is, the temperature of the first cooling chamber is greater than the second cooling chamber in series and this is true for all cooling chambers in series. Typically, the last cooling chamber will be set to a temperature below 60° C., for example, below 50° C., preferably to a temperature below 40° C.

In this manner, the reacted end product is cooled to a temperature below 60° C., preferably below 50° C., more preferably below 40° C. in a controlled and step-wise manner prior to being released from the cooling unit and exposed to the air.

It is of note that as discussed above, releasing the material at too high of a temperature can result in the release of volatile, toxic gases and can also result in oxidation of the plasticized material which in turn will reduce the quality and consistency of the end product. Similarly, cooling the material too quickly will also result in variability in physical and chemical properties.

As discussed above, in these embodiments, the rate of cooling is controlled by the speed of the conveying means that moves the processed material from the first cooling chamber to the last cooling chamber and eventually out of the machine.

Furthermore, it is of note that the cooling process also takes place under anaerobic conditions and that the processed material is not exposed to air until it has cooled to a temperature below 60° C., for example, 50° C. or preferably to a temperature below about 40° C.

It is of note that the last cooling chamber in series is arranged such that the screw auger promotes release of the processed material from the last cooling chamber without permitting the entry of air or oxygen into the device. As a result of this arrangement, in combination with the addition or spraying of the ground rubber crumb into the first plasticization chamber anaerobically or under air-tight conditions, no air or oxygen enters the device.

The invention will now by further illustrated and exemplified by way of examples; however, the invention is not necessarily limited to the examples. Specifically, as will be appreciated by one of skill in the art, a wide variety of conditions can be utilized to produce processed rubber powder having properties which are suitable for the desired end use. For example, the quality and physical characteristics of processed rubber powder to be used surfacing a playground or beneath a play structure is very different from the physical characteristics required for the production of mats for specific purposes which is in turn very different from the characteristics and properties necessary for the production of molded products.

Table 1 and Table 2 are a comparison of the effects of two different speed, two different temperature with the same chemical formula

TABLE 1

620 RPM/min, average temperature 200 Celsius
(formula: rubber powder 100 units, activating agent
0.8%, aromatic oil 15%, plasticizing agent 1.7%, talc 2%)
DEVULC POWDER(CAR TIRE 620) TDS

| PROJECT | DATA |
|---|---|
| Material | used car tire tread rubber |
| Size mesh | −24 |
| Heating loss % | 0.85 |
| Ash content % | 8 |
| Specific gravity g/cm3 | 1.14 |
| Acetone extract % | 14 |
| Mooney viscosity ML 100° C. (1 + 4) | 65 |
| Elongation at break % | 380 |
| Tensile strength Mpa | 5.9 |

TABLE 2

700 RPM/min, average temperature 215 Celsius
(formula: rubber powder 100 units, activating agent
0.8%, aromatic oil 15%, plasticizing agent 1.7%, talc 2%)
DEVULC POWDER(CAR TIRE 700) TDS

| PROJECT | DATA |
|---|---|
| Material | used car tire tread rubber |
| Size mesh | −24 |
| Heating loss % | 0.85 |
| Ash content % | 8 |
| Specific gravity g/cm3 | 1.14 |
| Acetone extract % | 14 |
| Mooney viscosity ML 100° C. (1 + 4) | 71 |
| Elongation at break % | 360 |
| Tensile strength Mpa | 6.5 |

As can be seen, increasing the reaction temperature increases the Mooney viscosity and the tensile strength but decreases the tensile strength.

Table 3 and Table 4 compare the properties of two different activators:

TABLE 3

Activating agent 0.8% Truck tire powder physical property
DEVULC POWDER(TRUCK TIRE 660) TDS

| PROJECT | DATA |
|---|---|
| Material | used truck tire tread rubber |
| Size mesh | −24 |
| Heating loss % | 0.85 |
| Ash content % | 8.9 |
| Specific gravity g/cm3 | 1.12 |
| Acetone extract % | 13.45 |
| Mooney viscosity ML 100° C. (1 + 4) | 72 |
| Elongation at break % | 312 |
| Tensile strength Mpa | 6.46 |

TABLE 4

Activating agent 1.6% Truck tire powder physical property
DEVULC POWDER(TRUCK TIRE 660) TDS

| PROJECT | DATA |
|---|---|
| Material | used truck tire tread rubber |
| Size mesh | −24 |
| Heating loss % | 0.85 |
| Ash content % | 8.9 |
| Specific gravity g/cm3 | 1.12 |
| Acetone extract % | 13.45 |
| Mooney viscosity ML 100° C. (1 + 4) | 61 |
| Elongation at break % | 360 |
| Tensile strength Mpa | 7.08 |

As can be seen, increasing the amount of activating agent lowers the Mooney viscosity but increases elongation at break and tensile strength.

As will be readily apparent to one of skill in the art, the above examples illustrate how reaction conditions can be modified to produce end products with different properties.

The scope of the claims should not be limited by the preferred embodiments set forth in the examples, but should be given the broadest interpretation consistent with the description as a whole.

The invention claimed is:

1. A method of recycling rubber comprising:
    (a) grinding a quantity of rubber to be recycled to a particle size between −10 mesh to −40 mesh, thereby producing rubber crumb;
    (b) providing a rubber plasticizing machine comprising a plasticizing unit comprising a plasticizing conveyor and a cooling unit comprising a cooling conveyor;
    (c) transferring the rubber crumb into the plasticizing unit;
    (d) mixing the rubber crumb with chemicals, thereby producing a mixture, said chemicals comprising a residual aromatic extract oil, a viscosity increaser and an activator;
    (e) heating the mixture in the plasticizing unit to a temperature between 200-250° C. and maintaining the mixture at said temperature for a pre-determined period of time;
    (f) transferring the mixture from the heating unit to the cooling unit;
    (g) cooling the mixture in the cooling unit to a temperature below 60° C.; and
    (h) releasing the mixture from the cooling unit.

2. The method according to claim 1 wherein the rubber is ground such that at least 50% of the rubber crumb passes through a screen with a mesh size of 40.

3. The method according to claim 1, wherein following step (a), calcium carbonate is added to the rubber crumb at 0.1-5% (w/w) of the rubber crumb.

4. The method according to claim 1 wherein the plasticizing unit and the cooling unit are air tight so that rubber crumb is plasticized under anaerobic conditions.

5. The method according to claim 1 wherein the chemicals and the rubber crumb are mixed by the plasticizing conveyor.

6. The method according to claim 1 wherein the aromatic oil is a low volatility aromatic oil.

7. The method according to claim 1 wherein the residual aromatic extract oil is added at 5-30% (v/w) of the rubber crumb.

8. The method according to claim 1 wherein the residual aromatic extract oil is added at 15-20% (v/w) of the rubber crumb.

9. The method according to claim 1 wherein prior to step (d) the residual aromatic extract oil is heated to a temperature between 55-65° C.

10. The method according to claim 1 where in the viscosity increaser is natural gum rosin.

11. The method according to claim 10 wherein the natural gum rosin has a chemical formula of $C_{19}H_{29}COOH$.

12. The method according to claim 10 wherein the rosin is added at 0.5-5% (v/w) of the rubber crumb.

13. The method according to claim 1 wherein the activator is a mixture of an activating agent selected from 420 or 450 and a plasticizing agent selected from 480 and 510.

14. The method according to claim 1 wherein the activator is a mixture of pentachlorothiophenol and stearic acid.

15. The method according to claim 14 wherein the activator is 30-45% pentachlorothiophenol and 55-70% stearic acid.

16. The method according to claim 1 wherein the activator is added at 0.05-0.8% (v/w) of the rubber crumb.

17. The method according to claim 1 wherein the predetermined time is 5-15 minutes.

18. The method according to claim 1 wherein at step (g) the mixture is cooled to a temperature below 50° C.

19. The method according to claim 1 wherein at step (g) the mixture is cooled to a temperature below 40° C.

20. The method according to claim 1 wherein the plasticizing unit comprises a plurality of plasticizing chambers connected in series.

21. The method according to claim 20 wherein each respective one of the plurality of plasticizing chambers is heated to a temperature lower than the adjacent next plasticizing chamber in series.

22. The method according to claim 1 wherein the cooling unit comprises a plurality of cooling chambers connected in series.

23. The method according to claim 22 wherein each respective one of the plurality of cooling chambers is cooled to a temperature lower than the adjacent next cooling chamber in series.

24. The method according to claim 1 wherein steps (c)-(g) are carried out anaerobically.

* * * * *